(12) United States Patent
Young et al.

(10) Patent No.: US 8,630,101 B2
(45) Date of Patent: Jan. 14, 2014

(54) POWER CONVERTERS

(75) Inventors: George Young, Blackrock (IE); Colin Gillmor, Limerick (IE)

(73) Assignee: Texas InstrumentsIncorporated, Dallas, TX (US)

( * ) Notice: Subject to any disclaimer, the term of this patent is extended or adjusted under 35 U.S.C. 154(b) by 287 days.

(21) Appl. No.: 13/212,761

(22) Filed: Aug. 18, 2011

(65) Prior Publication Data

US 2012/0044718 A1  Feb. 23, 2012

(30) Foreign Application Priority Data

Aug. 18, 2010  (GB) .................................... 1013847.7

(51) Int. Cl.
*H02M 3/335*  (2006.01)

(52) U.S. Cl.
USPC .............. 363/17; 363/21.02; 363/90; 363/89; 363/97

(58) Field of Classification Search
USPC ............. 363/16, 17, 21.02, 21.03, 22, 23, 24, 363/132, 133, 134, 40, 97, 98, 89, 90
See application file for complete search history.

(56) References Cited

U.S. PATENT DOCUMENTS

| | | | |
|---|---|---|---|
| 5,313,143 A * | 5/1994 | Vila-Masot et al. ...... | 315/209 R |
| 6,185,111 B1 | 2/2001 | Yoshida | |
| 6,292,375 B1 | 9/2001 | Perol | |
| 6,326,773 B1 | 12/2001 | Okuma et al. | |
| 7,609,037 B1 | 10/2009 | Herbert | |
| 8,369,109 B2 * | 2/2013 | Niedermeier et al. .......... | 363/17 |
| 2009/0231884 A1 * | 9/2009 | Bong et al. ...................... | 363/17 |
| 2009/0296429 A1 | 12/2009 | Cook et al. | |

FOREIGN PATENT DOCUMENTS

| | | |
|---|---|---|
| EP | 0767529 | 4/1997 |
| JP | 2005051991 | 2/2005 |
| KR | 20100016733 | 2/2010 |
| WO | 9322827 | 11/1993 |
| WO | 2005101632 | 10/2005 |
| WO | 2010143048 | 12/2010 |

OTHER PUBLICATIONS

"Designing UCC28250 as a Secondary Side Control for Output Turn-On with a pre-Bi8as Condition," Data Sheet, Texas Instruments, Application Report, SLAA477—Nov. 2010.

(Continued)

*Primary Examiner* — Nguyen Tran
(74) *Attorney, Agent, or Firm* — William B. Kempler; Wade J. Brady, III; Frederick J. Telecky, Jr.

(57) ABSTRACT

A power converter for delivering power to a load at a regulated voltage 11 includes a regulating stage receiving an unregulated supply 10 and having a main transformer 18. Switches 16a and 16b are arranged in a half-bridge connect the transformer primary 17 to the unregulated supply 10 to drive the load via a rectifying stage connected to the transformer secondary 19. The on-time of the switch is controlled by a controller 14 to effect the regulation over a range of values of the unregulated supply. An auxiliary transformer 103 has a secondary winding 104 connected in series with the main transformer primary 17 and a primary winding that is selectively driven via a switch 106. A comparator 107 detects a low voltage event within the regulating stage, such as a drop in the intermediate voltage at 10. The primary winding 105 of the auxiliary transformer 103 is driven during the low voltage event.

20 Claims, 4 Drawing Sheets

(56) References Cited

OTHER PUBLICATIONS

"Switchmode Power Supply Handbook," Second Edition, K. Billings, McGraw-Hill 1999, pp. 4.14-4.15.

PCT Search Report dated Jan. 19, 2012.
GB Search Report dated Jan. 30, 2013.

* cited by examiner

POWER CONVERTERS

CROSS-REFERENCE TO RELATED APPLICATIONS

This patent application claims priority from Great Britain Patent Application No. 1013847.7, filed Aug. 18, 2010, which is incorporated herein by reference in its entirety.

The present invention relates to power conversion and in particularly power converters such as those employing half bridge stages with resonant or integral cycle control approaches. It is relevant for example to Isolated AC/DC converters and DC-DC converters especially those designed for high operating efficiency. It may further be applied to designs which operate most efficiently with a high duty cycle.

Many types of power converter are known but in a typical arrangement line voltage will be rectified (from an AC line or mains supply), typically using also a power factor correction stage, to a nominal dc intermediate voltage that is not the voltage expected by the load and is neither regulated to the accuracy or bandwidth required by the load nor isolated as is ordinarily required. The intermediate voltage is switched to supply a load with current such that the supply voltage is regulated. Energy is supplied to the load via a switch that feeds an inductive element or works in resonant fashion. The switch-inductor combination supplies energy to the load: if the voltage falls below its regulated value, the switch is turned on to increase supply, conversely if the output is above its regulated value, the switch may be turned off. As is well known, there is advantage in making this intermittent switching periodic at a relatively high frequency where the efficiencies of the inductive configuration may be exploited, the switching may also be subjected to pulse width modulation (PWM) wherein switching can occur every PWM cycle: the switch being kept on for a relatively longer time if supply is demanded and a relatively shorter time (or not at all) if it is not. The same basic switching regime is employed in simpler controllers not subject to PWM such as hysteretic or self oscillating types. The regulated voltage is smoothed by a capacitor which can also supply the load at times when no energy is available from the switch-inductor combination. At times only the inductor may supply the load. It is common for the inductive element to be arranged as part of a transformer or with a transformer so that the load is electrically isolated from line mains supply.

Since the intermediate voltage is unregulated, the regulating stage must be able to operate over a range of input voltage and remove any ripple that persists in the intermediate voltage. Typically, as the intermediate voltage falls towards the bottom of its range, the switching element will be having higher on-time (duty cycle) to supply the same amount of power to the load; as the intermediate voltage rises, the switching element will be on for relatively less time to supply the same amount of power to the load, even reaching a point where the on time is reduced to zero and entire switching cycles are dropped. While such a regime may achieve adequate regulation, there may be problems with efficiency if cycle dropping is commonplace, since supplying the load with energy which has been inductively stored is less efficient than supplying the load when the regulating switch is on. If the intermediate voltage could be kept constant, then the regulating stage could be designed for maximum efficiency. Unfortunately, this is not the case in practice and the greater the range of intermediate voltage that must be accommodated, the more chance there is that the regulating stage will be operating in a regime away from its maximum efficiency. Hence it is a normal design goal to minimize the range of intermediate voltage. These principles apply also in the case of resonant converters, whose efficiency is optimized if they can operate over a narrow regulation range.

A particular problem is transients which may occur in demand from the load. For example, in the event of a load transient (e.g. turning on an appliance that was on stand-by) the regulating stage will suddenly demand additional energy from the input stage. There may be many reasons why the input stage will be slow to react to such a demand. Stabilizing the intermediate voltage implies large capacitors which may be impracticable in a small supply, moreover, the current demand of the stage may be subject to power factor corrective techniques which limit its ability to respond to certain parts of the mains line cycle, or which need slow control loops on input current distortion criteria. The inevitable consequence is that the intermediate voltage drops, the maximum extent of this drop defining the lower limit of the intermediate voltage range.

Accommodating such transients means that the normal operating point is more likely to settle towards the top of the range where inefficiencies can occur. The present invention seeks to address this problem and generally provide an improved power converter.

It is known that one way to regulate the output of a power converter is to modulate the turn ratio of the final output transformer and the scheme described in U.S. Pat. No. 7,609,037 is based in part upon this principal. Unfortunately, if there is any significant range to the expected intermediate voltage, the required transformer structure become very complicated and costly. However, if such an arrangement is employed, the patent goes on to explore the possibility of using the turns ratio selection of such a transformer to allow the regulation stage to operate at maximum efficiency at the normal operating voltage and as described in that patent this occurs at the expense of efficiency elsewhere in the range, for example during transient events. Presently speaking, however, thinking on power conversion has moved away from the notion of optimising for an expected normal operating point with specifications typically requiring efficiency over a range of operating conditions, for example at both no load and full load. Unfortunately this is typically well beyond the range that turns ratio selection could accommodate and fundamental improvements in the control regimes applied to the regulation stage have rendered such a technique largely redundant. In any case, the regimes available in comparatively inexpensive integrated circuit controllers have advanced to the point where the cost of a turn ratio selectable main transformer cannot be justified.

The present invention provides apparatus and method as set forth in the claims and in one aspect thereof a power converter for delivering power to a load at a regulated voltage and including a regulating stage; said regulating stage receiving an unregulated supply and including a transformer; a switch to connect the transformer on a primary side thereof to the unregulated supply to drive the load, the on time of said switch being controlled to effect said regulation over a range of values of said unregulated supply; and a rectifying stage connected to the transformer on a secondary side thereof to supply the load; an auxiliary transformer having a secondary winding connected in series with the isolating transformer on the primary side thereof and a primary winding that is selectively driven; the power converter further including a comparator for detecting a low voltage event within the regulating stage, the primary winding of the auxiliary transformer being driven while said low voltage event persists.

The power converter may include a power factor correction stage to generate said unregulated supply from a mains or ac-line input. The response to detection of a low voltage event to driven the auxiliary transformer may be faster than the response of the power factor correction stage to a change in load demand. Advantageously, the comparator is arranged to detect a low unregulated supply voltage as said low voltage event.

In an arrangement of the present invention, drive to the primary winding of the auxiliary transformer is made selective by a switch which shorts out the primary winding when the low voltage event is not detected. Advantageously, the switch may be part of a half-bridge arrangement and co-operates with a second switch of the half bridge to drive the transformer in push-pull. In one form of the invention, the low voltage event may be ripple on the unregulated supply, and in particular the ripple may be at twice a mains or ac-line frequency. The auxiliary transformer may be arranged as an individual toroidal transformer and there may be a plurality of similarly arranged additional auxiliary transformers.

Embodiments of the present invention may include a controller, the controller including circuitry for or being adapted to control said switch to effect said regulation and receive the output of said comparator and in response thereto selectively drive said auxiliary transformer. Advantageously, the response of said controller to the output of the comparator to drive the auxiliary transformer may be faster than the response of the controller to regulate the output in the event of a change in load demand. Indeed, the present invention encompasses a controller for a power converter.

BRIEF DESCRIPTION OF THE DRAWINGS

In order that features and advantages of the present invention may be further appreciated an embodiment will now be described by way of example only and with reference to the accompanying diagrammatic drawings of which.

DETAILED DESCRIPTION OF AN EXAMPLE EMBODIMENT

Figure 1:
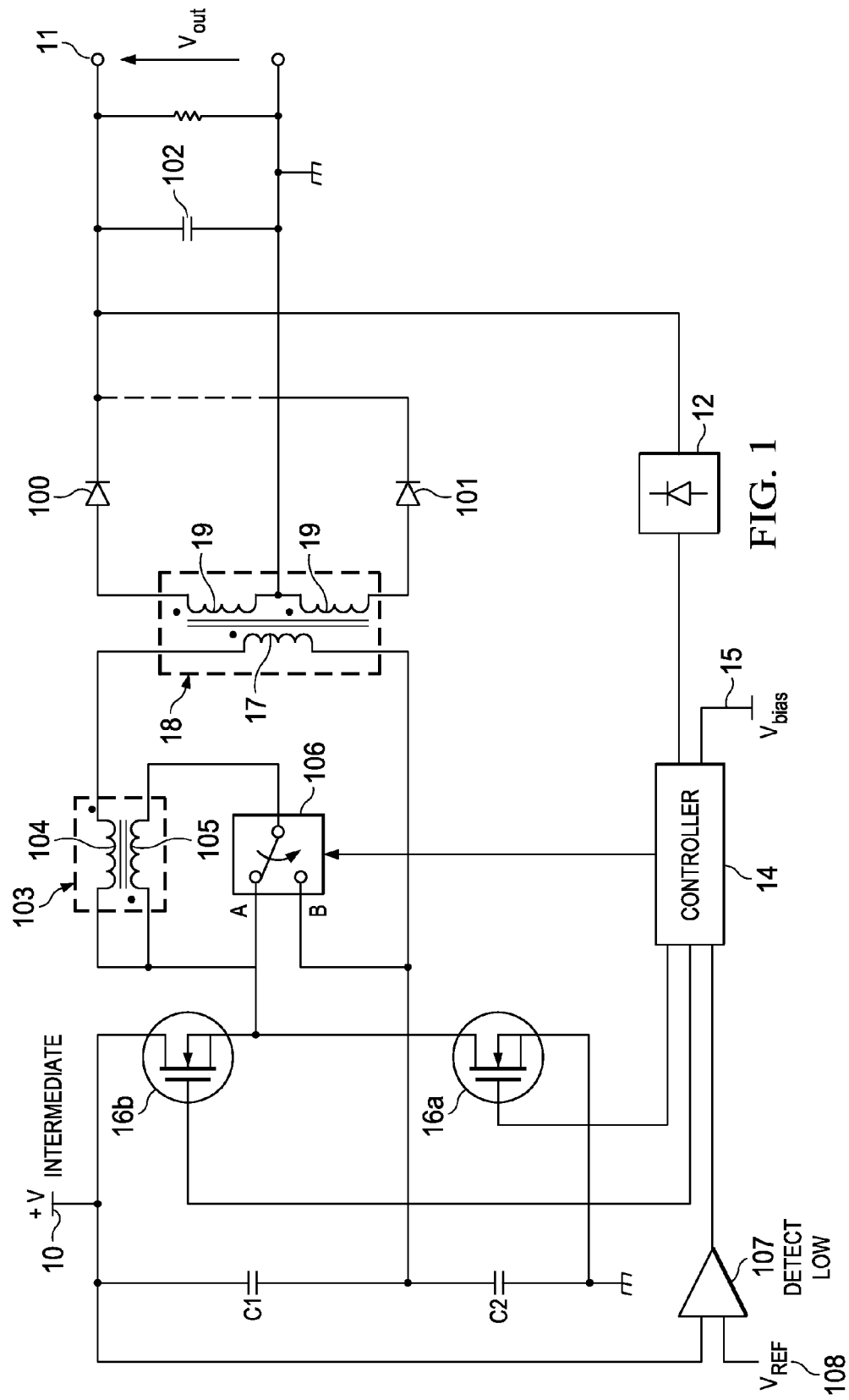
FIG. 1 represents a basic power converter employing the principle of the present invention.

In FIG. 1, there is depicted a basic power converter for converting an unregulated intermediate voltage at 10 (+V) into a well defined and regulated output voltage at 11 (Vout). For and AC-DC converter the intermediate voltage may be derived from an ac line or mains supply via a straightforward bridge rectifier and capacitor arrangement.

Vout is sensed via an isolating opto-coupler 12 by a controller 14. The sensed voltage is compared with a voltage at another controller input 15 (Vbias) which is set externally to be representative of a desired voltage level at Vout. If Vout is low compared to Vbias, then the controller 14 is arranged to pulse a switching transistor (16a or 16b) ON, to draw current through a primary winding 17 of a main transformer 18 between the intermediate voltage and ground. The pulse energises the secondary winding 19 of transformer 18 which winding is center tapped so that the resulting voltage is rectified by diodes 100 and 101 to boost Vout, the voltage at which is stabilized by a bulk capacitor 102. Switches 16a and 16b are arranged in a bridge configuration together with capacitors C1 and C2 and may be pulsed alternately to push and pull current through the primary winding 17. As thus far described, the operation of the converter is conventional and will be well recognized by those skilled in the art. The arrangement of FIG. 1 embodies the present invention and is adapted to respond to transient events that result in a drop in the intermediate voltage. Such events may be occasioned by a drop in the supply from which the intermediate voltage is derived or indeed by the connection to or increased demand from a load to the output which results in sustained energy demand causing the unregulated intermediate voltage to fall. In particular the arrangement of FIG. 1 includes an auxiliary transformer 103, the secondary winding 104 of which is connected in the series path from the primary winding 17 of the main transformer 18 to the intermediate voltage at 10. Primary winding 105 of the auxiliary transformer 103 is connected between the intermediate voltage at 10 and the aforementioned switching transistor 16 via a switch 106 that is controlled by controller 14.

Controller 14 also receives a signal from a comparator 107, being the result of a comparison between the intermediate voltage at 10 and a voltage at 108 (Vref) which is set externally to be representative of a normal or expected intermediate voltage. When the intermediate voltage is substantially at this normal or expected level, the controller 14 is arranged to maintain switch 106 at position A, whereby the primary winding 105 of auxiliary transformer 103 is shorted out. Under these circumstances, the auxiliary transformer 103 is ineffective resulting in conventional operation as described above. When a low intermediate voltage is detected by comparator 107, the controller 14 is arranged to respond to its output by switching switch 106 to position B such that any ON pulse applied to the primary winding 17 of the main transformer 17 by the switching transistors 16a and 16b is also applied to the primary winding 105 of auxiliary transformer 103. In this way, the auxiliary transformer 103 is energised at the same time as the main transformer 18 thereby boosting the voltage applied to its primary winding 17 above the lowered intermediate voltage. Hence the application of the present invention ameliorates the effect of the lowered intermediate voltage and more energy is transferred to the output than would have been the case with the conventional arrangement.

The arrangement of FIG. 1 is rather basic and it may be unable to deliver the performance required in many applications. In particular, no power factor correction (PFC) is applied. A further embodiment will now be described which incorporates PFC in an arrangement based on a stage of the commonly employed half bridge regulating isolation type.

Figure 2:
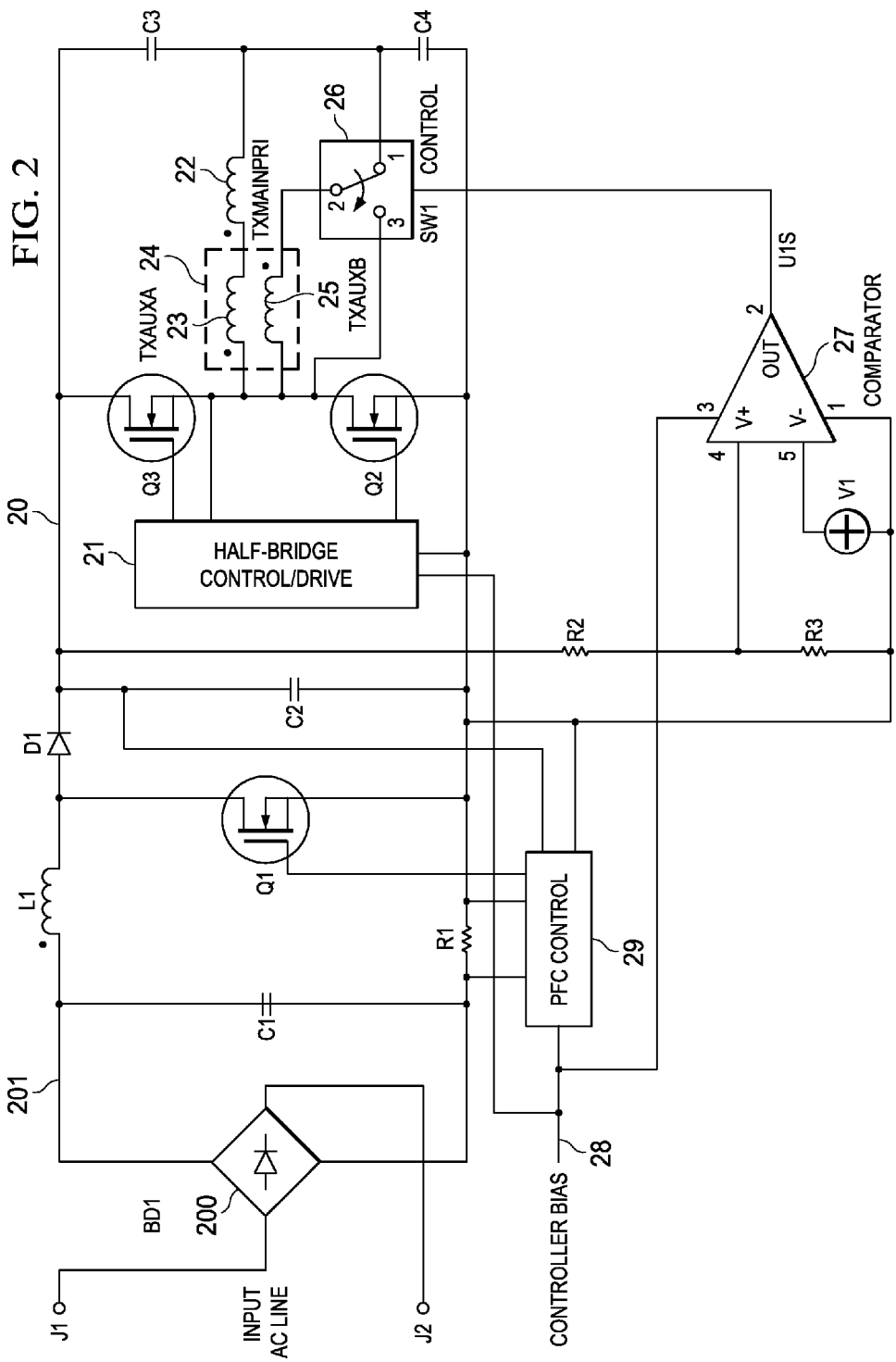
FIG. 2 represents an alternative embodiment of the present invention.

In the arrangement of FIG. 2, an intermediate voltage is established at a point 20. Transistors Q2 and Q3 are arranged as a half bridge and are controlled by a Half Bridge Controller 21 to operate in push-pull to energise a primary winding 22 of a main isolating transformer, the output being regulated to conform to a level setting by applying a bias voltage at 28 to the controller input. The secondary circuit of this main transformer has been omitted from FIG. 2 but it may be the same as the main transformer secondary circuit of the arrangement of FIG. 1 or any suitable alternative to give the desired output. The half bridge controller may be of conventional type and operation, for example of the type UCC28250 obtainable from Texas Instruments Incorporated, the datasheet of which is hereby incorporated herein by reference. The UCC28250 is a PWM capable device and the half bridge may be optionally subject to a PWM regulation regime. The main transformer primary winding 22 is connected to the push-pull node of transistors Q3 and Q4 via a secondary winding 23 of an auxiliary transformer 24, with the bridge being completed by capacitors C3 and C4. A primary winding 25 of the auxiliary transformer 24 is connected via a switch 26 such that it is either shorted out (switch position 2-3) or connected across the bridge in parallel with the primary winding 22 of the main transformer 24 to be subject to push-pull drive by Q3 and Q4 (switch position 2-1). The switch 26 is controlled by an output of a comparator 27 which compares the intermediate voltage at 20 scaled by a resistive divider comprising R2 and R3 with a reference voltage V1 which represents a normal or expected intermediate voltage subject to the same scaling such that when the scaled intermediate voltage falls below V1, the switch is in position 2-1 and otherwise in position 2-3. Thus, the auxiliary transformer acts to boost the voltage applied to the primary winding 22 of the main transformer above the level of half of a lowered intermediate voltage. When the intermediate voltage is normal, control is conventional.

It will be appreciated that unlike the case of a variable turns ratio transformer used for regulation, the main transformer of the present embodiment may be designed for efficient control over a range of operating points using the advanced control regimes built into devices such as the UCC28250 already mentioned with the auxiliary transformer of the present invention deployed during transient events to extend the range even further. Indeed, even a variable output voltage supply may be realized by allowing the controller bias at 28 to be varied. As an alternative to the UCC28250, a device such as the UCC29900 (also obtainable from Texas Instruments Incorporated and the datasheet of which is hereby incorporated herein by reference) may be used. The UCC29900 employs an integral cycle control regime. The present invention may be particularly effective with such a regime; since energy demand from the supply is kept substantially constant within a supply cycle, a drop in intermediate voltage is particularly likely if the onset of the transient event occur early on in a cycle.

Figure 3A:
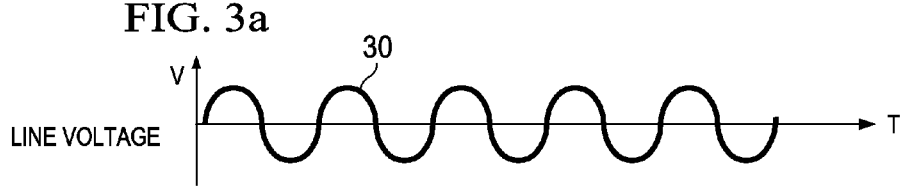
FIG. 3 shows some waveforms associated with the embodiment of FIG. 2.
Figure 3B:
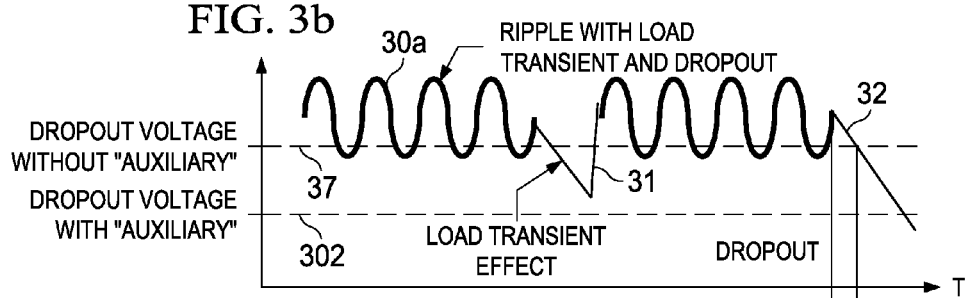
Figure 3C:
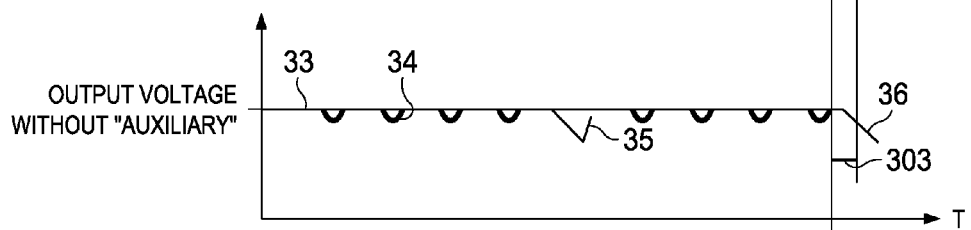
Figure 3D:
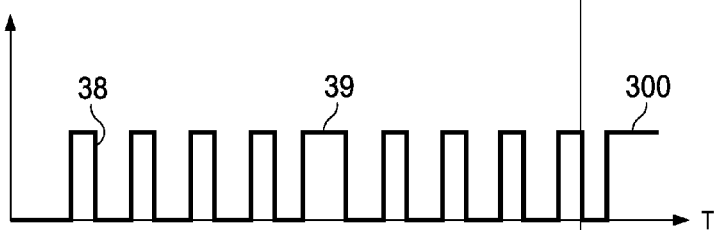
Figure 3E:
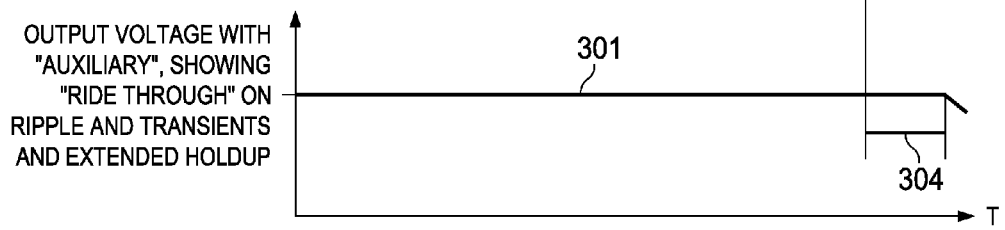

As mentioned above, the arrangement of FIG. 2 includes power factor control and to this end includes a PFC Controller 29. A convenient way of effecting PFC is to place a boost stage intermediate a first intermediate voltage established by rectification and the final intermediate voltage used by the regulating stage and this is the arrangement adopted in the embodiment of FIG. 2. An AC supply (J1, J2) is applied to a bridge rectifier 200 to establish a first intermediate voltage at 201 which is boosted by a boost stage comprising transistor Q1, inductor L1 diode D2 and capacitor C2. The operation of such a stage is well known and much described (see for example: Billings, K; Switchmode Power Supply Handbook, Second Edition, McGraw-Hill, 1999; pp 4.14-5) so will not elaborated here. Indeed integrated circuit PFC controllers are available such as the UCC28070, obtainable from Texas Instruments Incorporated and the datasheet of which is hereby incorporated herein by reference. Suffice to say that Q1 is controlled by PFC controller 29 to match the current demand of the stage to the line voltage phase so that a good power factor is achieved. As is well known, since the PFC control actual matches to the rectified sinewave haversine waveform, the boost output and therefore the intermediate voltage at 20 contains ripple at a frequency twice that of the AC supply. It is a conventional design problem to configure the regulation control regime to deal with intermediate voltage ripple so that only an acceptable level of ripple remains in the eventual output, however the present invention provides an alternative approach in which the ripple is not dealt with or not fully dealt with by conventional control techniques but handled as a transient intermediate voltage lower event. An example of this will now be considered with reference to the embodiment of FIG. 2 and the waveforms of FIG. 3 of which FIG. 3(a) represents the line input at J1-J2. FIG. 3(b) represents in offset form the intermediate voltage at 20; FIG. 3(c) represents the output voltage of a conventional scheme not subject to the present invention, that is to say how the scheme of FIG. 2 would behave if the switch 26 were maintained in position 2-3 so that the primary winding 25 of the auxiliary transformer 24 were permanently shorted; FIG. 3(d) represents the output of comparator 27; and FIG. 3(e) represents the output of the scheme of FIG. 2 as shown.

Trace 30 represents the line voltage sinusoid which gives rise to ripple at twice the line frequency in the intermediate voltage 30a. To demonstrate the behaviour of the embodiment under various conditions the effect of a load transient and a mains dropout (when the intermediate voltage begins to collapse completely) are illustrated in FIG. 3(b) at 31 and 32 respectively. It will be observed that the control regime is unable to regulate the transient event which propagates through to the output at 35. Clearly a full drop out can never be regulated and this too propagates to the output at 36 after a hold-up time 303.

Although this may not always be the case, in the present embodiment the regulation control is such that even some ripple 34 is present at the output. Thus the scheme drops out of regulation when the intermediate voltage falls below a level 37.

In accordance with the present invention, the input to comparator 27 (V1) is set to correspond to level 37. Trace 38 shows the control applied to the switch such that the auxiliary transformer is brought into circuit whenever the intermediate voltage drops below level 37. Since the voltage across the primary winding 22 of the main transformer is now boosted, the effective voltage at which drop out occurs is reduced by an equivalent amount to level 302. It will now be observed that ripple is removed from the output voltage 301 of the arrangement. Neither does the effect of the transient event 31 which results in an extended boost period 39 does not propagate to the output 301. Eventually, the output cannot be regulated in response to mains drop out event 32, however even here it will be observed that the hold-up time has been improved from a time 303 to a longer time 304. Hence the present invention provides a scheme able to tolerate a longer period of mains drop out than before.

In the scheme of FIG. 2 even if ripple is dealt with by conventional means, the auxiliary transformer approach of the present invention may be deployed to counteract the effect of the transient and drop out events mentioned above, which are more likely to occur given the additional constraints imposed by PFC which prevent the input circuitry responding quickly to correct a low intermediate voltage.

The transformer as shown here may typically have a ratio of turns on the primary winding 25 as compared with the secondary winding 23 of perhaps 8:1 which in the switched configuration as shown this can effect a 12.5% reduction in the effective turn ratio of the main transformer. Indeed, in one aspect the auxiliary transformer 24 may be regarded as effecting a net adjustment to the main transformer turns ratio in the isolation stage of the power converter. This has material advantages in that the power converter isolation stage can operate at optimal efficiency corresponding to alterations in the input voltage, if a fixed output voltage is required, or alternatively, the converter stage can operate efficiently if the output voltage is to be controlled over some range. As an example where the input voltage may alter, one can cite the usage of a power factor correction ("PFC") stage feeding an isolation stage equipped with an auxiliary transformer implemented as described. The auxiliary transformer is controlled on a feedforward basis from the level of the input voltage to the stage in question (intermediate voltage).

A power factor correction stage will have an output ripple at twice the input line frequency, and the amplitude of this ripple will be dependent on the value of output capacitance selected. This capacitor is typically a large electrolytic device, and the opportunity of replacing this by a smaller device, perhaps by a ceramic part in for example lighting-type applications, could be attractive. The PFC stage control is typically slow, and this can give rise to load-transients giving material deviations from the nominal level, in addition to those associated with ripple. The present invention addresses this problem. It is also possible to implement an arrangement where the switch is modulated in such a manner as to effect control of the output voltage itself, for example regulating or partially regulating the output.

In alternative embodiments there may be several stages of auxiliary transformer deployment with, for example, an auxiliary transformer having a plurality of switchable turns ratio combinations where the main transformer turns ratio is effectively adjusted dynamically to allow the isolation stage to operate in the optimal fashion—typically as close to full duty cycle as possible. A practical matter is that the control of the isolation stage must be able to manage a sudden change in the operating environment, and this could be addressed by having a plurality of switched auxiliary transformers giving a gradual approach. It should be noted that the power processed by each auxiliary transformer and its associated local switch is proportional to the degree of adjustment to be effected in the turns ratio, so the transformer or transformers here can be typically small toroids in most practical applications which would provide a cost effective solution.

Figure 4:
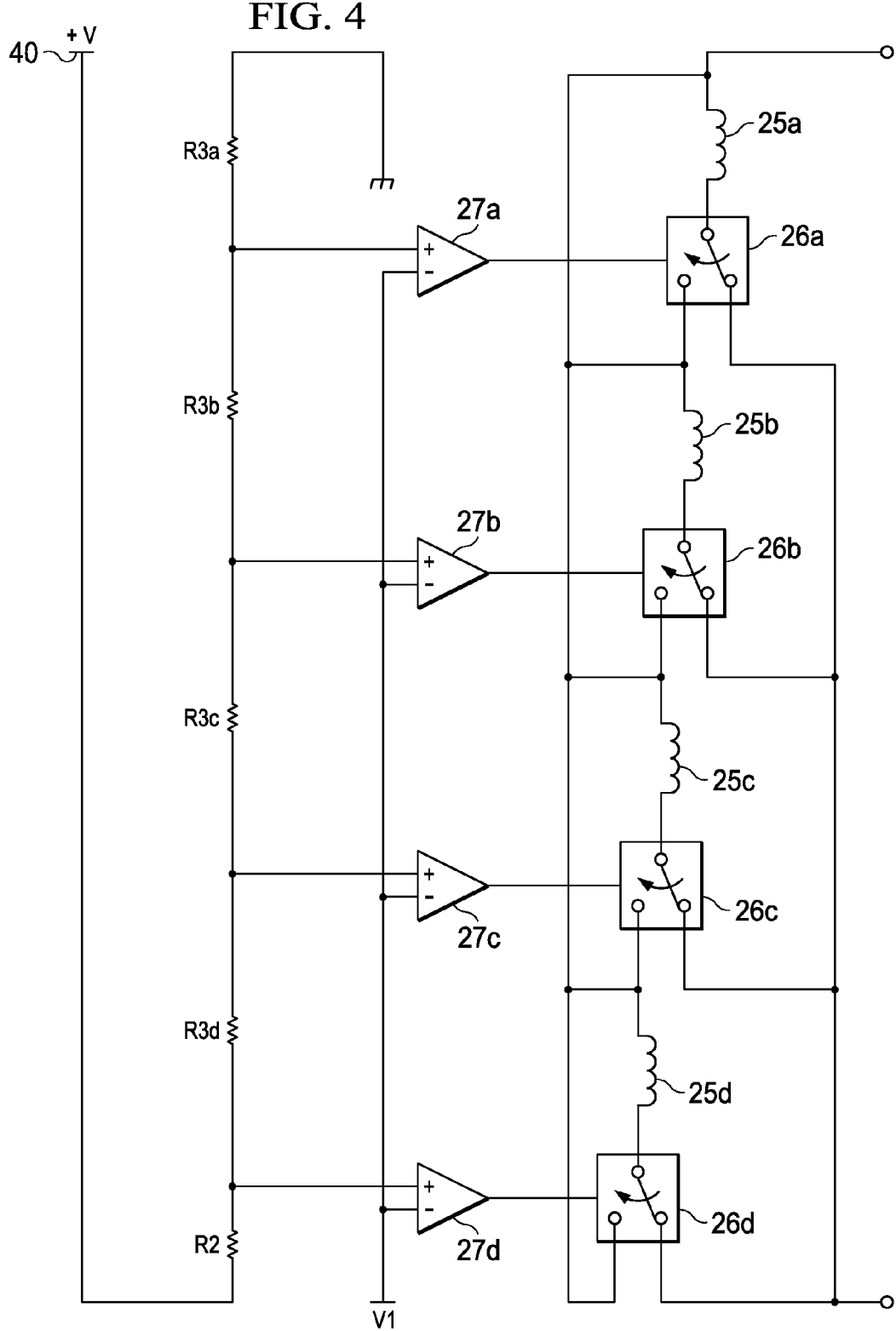
FIG. 4 shows an arrangement including four auxiliary transformers.

FIG. 4 shows primary windings of a set of auxiliary transformers comprising a plurality of segments 25a ... 25d to replace the auxiliary transformer 24 in the scheme of FIG. 2 to yield a further embodiment of the present invention. As the intermediate voltage at 40 falls, comparators 27a ... 27d are successively triggered to release the corresponding transformer segments from a short circuit imposed by normally closed changeover switches 26a ... 26d. In this way a gradual introduction of main transformer primary winding boost may be effected.

Although the invention has been described in detail, it should be understood that various changes, substitutions and alterations can be made thereto without departing from the spirit and scope of the invention as defined by the appended claims.

The invention claimed is:

1. A power converter for delivering power to a load at a regulated voltage and including a regulating stage;
   said regulating stage receiving an unregulated supply and including a transformer;
   a switch to connect the transformer on a primary side thereof to the unregulated supply to drive the load, the on time of said switch being controlled to effect said regulation over a range of values of said unregulated supply; and
   a rectifying stage connected to the transformer on a secondary side thereof to supply the load;
   an auxiliary transformer having a secondary winding connected in series with the transformer on the primary side thereof and a primary winding that is selectively driven;
   the power converter further including a comparator for detecting a low voltage event within the regulating stage, the primary winding of the auxiliary transformer being driven during said low voltage event.

2. A power converter as claimed in claim 1 further comprising a power factor correction stage to generate said unregulated supply from a mains or ac-line input wherein the transformer is isolating transformer.

3. A power converter as claimed in claim 2 wherein the response to detection of a low voltage event to driven the auxiliary transformer is faster than the response of the power factor correction stage to a change in load demand.

4. A power converter as claimed in claim 1 wherein the comparator is arranged to detect a low unregulated supply voltage.

5. A power converter as claimed in claim 1 wherein said drive to the primary winding of the auxiliary transformer is made selective by a switch which shorts out the primary winding when the low voltage event is not detected.

6. A power converter as claimed in claim 1 wherein the switch is part of a half-bridge arrangement and co-operates with a second switch of the half bridge to drive the transformer in push-pull.

7. A power converter as claimed in claim 1 wherein the low voltage event is ripple on the unregulated supply.

8. A power converter as claimed in claim 7 wherein the ripple is at twice a mains or ac-line frequency.

9. A power converter as claimed in claim 1 further comprising an additional auxiliary transformer arranged similarly to the auxiliary transformer.

10. A power converter as claimed in claim 9 and including a plurality of similarly arranged additional auxiliary transformers.

11. A power converter as claimed in claim 1 further comprising an auxiliary transformer arranged as an individual toroidal transformer.

12. A power converter as claimed in claim 1 further comprising a controller, the controller including circuitry for or being adapted to:
   control said switch to effect said regulation; and
   receive the output of said comparator and in response thereto selectively drive said auxiliary transformer.

13. A power converter as claimed in claim 12 wherein the response of said controller to the output of the comparator to drive the auxiliary transformer is faster than the response of the controller to regulate the output in the event of a change in load demand.

14. A controller for a power converter as claimed in claim 11 comprising:
   means for controlling said switch to effect said regulation; and
   means for receiving the output of said comparator and in response thereto selectively drive said auxiliary transformer.

15. A controller as claimed in claim 14 wherein the response of said controller to the output of the comparator to drive the auxiliary transformer is faster than the response of the controller to regulate the output in the event of a change in load demand.

16. A controller as claimed in claim 14 comprising:
   means for controlling a power factor correction stage to generate said unregulated supply from a mains or ac-line input.

17. A controller as claimed in claim 15 comprising:
   means for controlling a power factor correction stage to generate said unregulated supply from a mains or ac-line input.

18. A controller as claimed in claim 16 wherein the response of said controller to detection of a low voltage event to drive the auxiliary transformer is faster than the response of the power factor correction stage to a change in load demand.

19. The converter as claimed in claim 10 wherein each of said plurality of auxiliary transformers is in series with said auxiliary transformer and controlled by a switch responsive to said intermediate voltage to gradually introduce main transformer primary winding boost.

20. A method for delivering power to a load at a regulated voltage from a regulating stage comprising:

receiving an unregulated voltage;

connecting the unregulated voltage to a primary winding of a transformer via a switch to drive power to a load, controlling on-time of said switch to regulate output voltage over a range of values of said unregulated voltage;

rectifying an output of a secondary side of said transformer to supply said load;

providing an auxiliary transformer having a secondary winding connected in series with the primary winding of the transformer;

detecting a low voltage event within said regulating stage; and selecting driving a primary winding of the auxiliary transformer during said low voltage event.

* * * * *